Patented Mar. 14, 1950

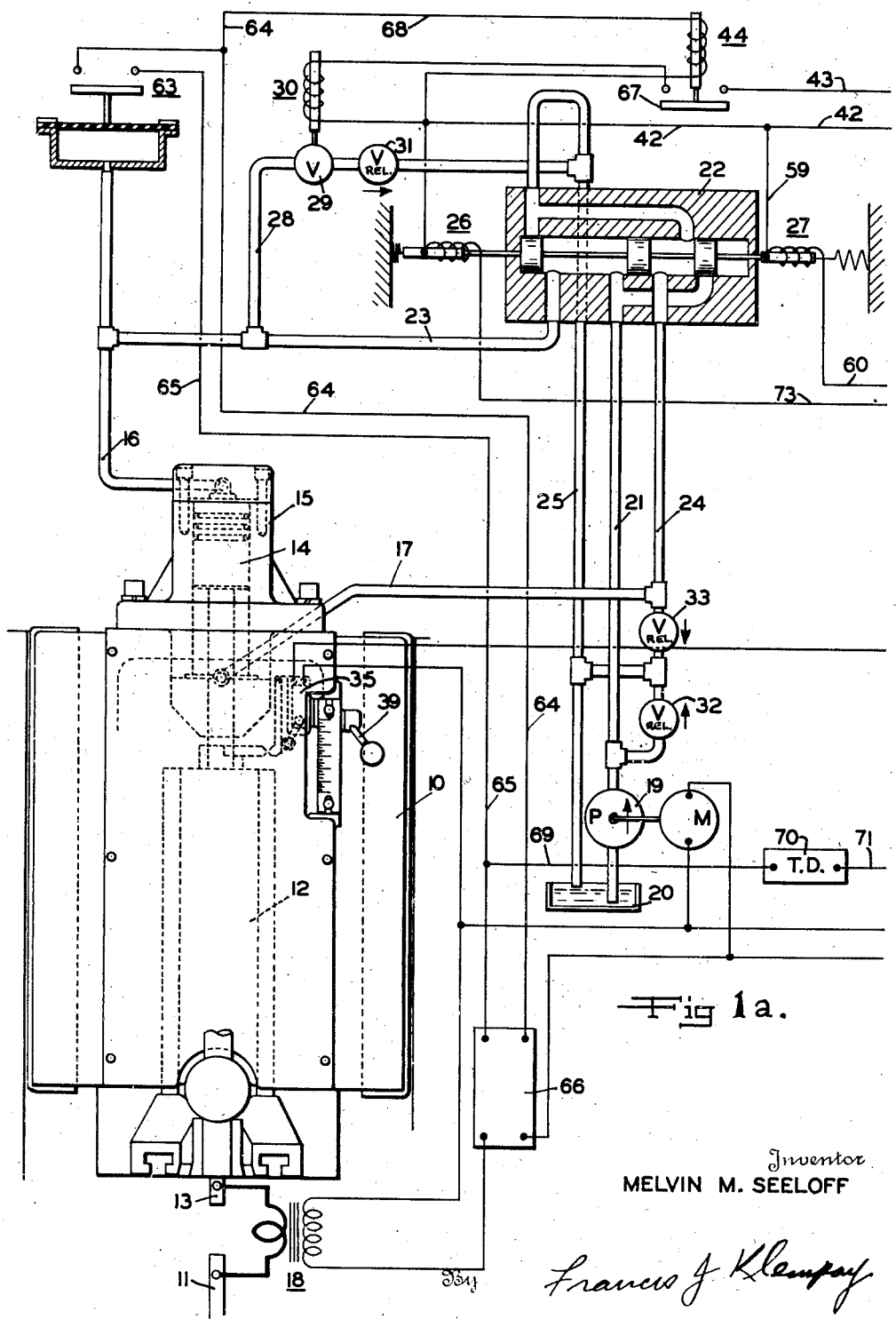

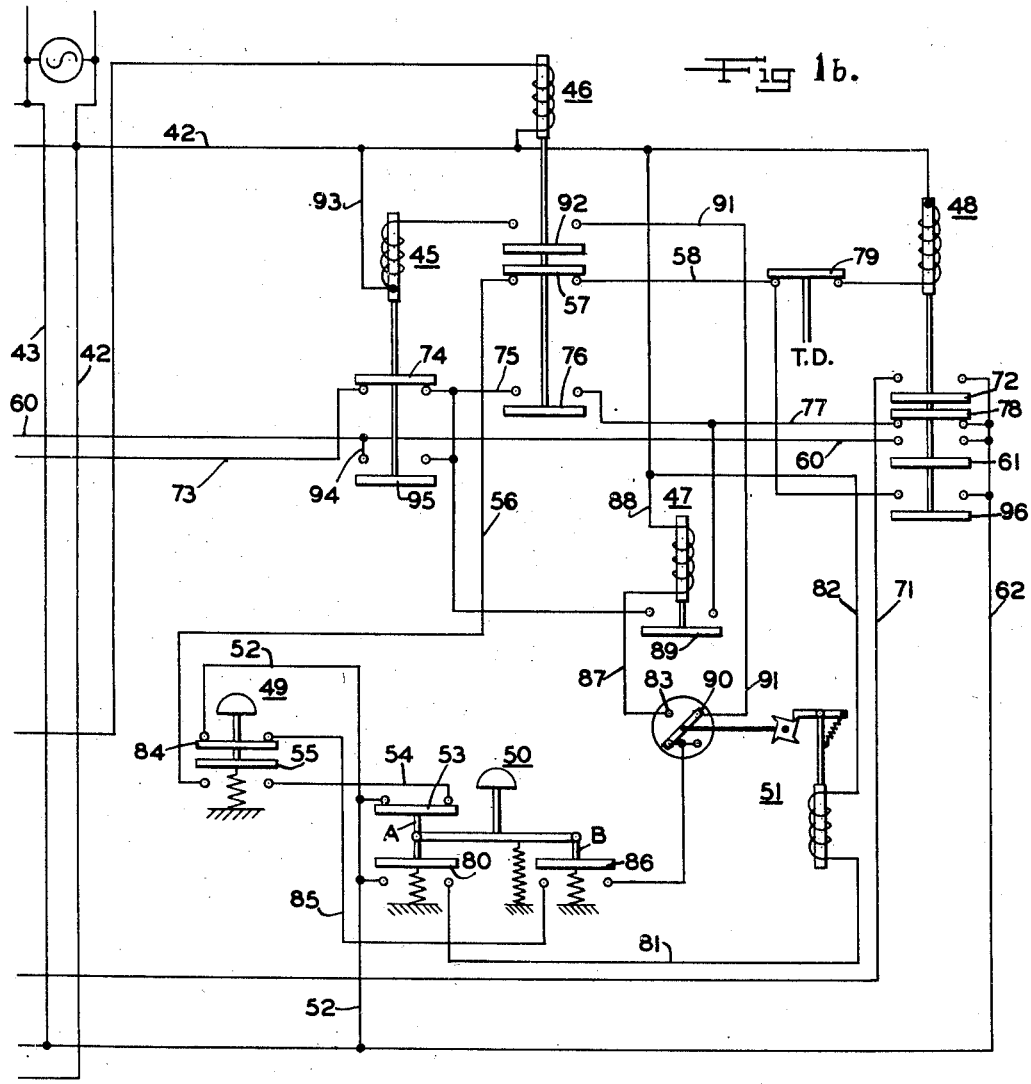

2,500,876

UNITED STATES PATENT OFFICE 2,500,876

OPERATING HEAD FOR WELDING MACHINES AND THE LIKE

Melvin M. Seeloff, Warren, Ohio, assignor to The Taylor-Winfield Corporation, Warren, Ohio, a corporation of Ohio Application June 26, 1946, Serial No. 679,333

6 Claims. (Cl. 219—4)

This invention relates to electric resistance welding apparatus, particularly of the spot or press welding type, and is concerned more specifically with improved apparatus for actuating and controlling the actuation of the movable electrode or head of the welding machine. In machines of this character, it has heretofore been proposed to associate with the electrode or head moving means apparatus for governing the initial welding force applied and, further, additional means to abruptly increase the welding force to effect a forging action in precisely timed relation in the welding cycle. A system of this nature, utilizing a hydraulic fluid cylinder is disclosed and claimed in United States Patent No. 2,392,296 wherein the increased or forging pressure is effected by abruptly diverting a moving column of hydraulic fluid into the outer end of the cylinder in such manner that the kinetic energy inherent in the moving column of fluid is converted and utilized to provide the increased welding force.

In the system of the above mentioned patent the hydraulic fluid is, of course, also employed to effect opening and closing of the welding electrodes of the welding machine for insertion and removal of work pieces as will be understood. In welding machines of the subject character it has also been proposed to provide an arrangement whereby the movable electrode of the assembly has a relatively short normal operating stroke to lessen machine wear and to keep the time required for completion of successive welding cycles to a minimum, and to provide a further arrangement to greatly increase the opening stroke of the movable electrode instantly at the will of the operator to facilitate dressing and change of electrodes, insertion of bulky work pieces, etc. The present invention provides a simple and economical arrangement for incorporating this additional desirable operating feature in a spot or press welder of the general character first described.

Another object of the invention is the provision of an improved apparatus for controlling the length of the normal operating stroke of an electrode carrying head in an electric resistance spot or press welding machine.

A further object of the invention is the provision of an improved control system and circuit for a movable electrode carrying head of an electric resistance welding machine embodying apparatus for providing a normal length of operating stroke and an increased length retraction stroke which is instantly available at the will of the operator.

The above and other objects and advantages of the invention will become apparent upon consideration of the following detailed specification and the accompanying drawing wherein there is disclosed a preferred embodiment of the invention.

In the drawing:

Figure 1 is a combined mechanical and schematic line diagram representation of a welding machine constructed in accordance with the principles of the invention; and Figures 2 and 3 are fragmentary mechanical views of a portion of the apparatus of Figure 1.

Reference numeral 10 designates a bracket which extends outwardly from the principal frame or housing of the complete welding machine, not shown, and in accordance with usual practice a normally fixed electrode 11 is suitably carried by such frame or housing. Slideably mounted in the bracket 10 is a quill 12 carrying at its lower end a welding electrode 13 and being connected at its upper end with a rod leading to a piston 14 housed in cylinder 15. Hydraulic fluid is admitted to the upper end of cylinder 15 through conduit 16 and to the lower end of the cylinder through conduit 17. Electrodes 11 and 13 are connected in the usual manner to the secondary of a welding transformer 18.

Hydraulic fluid pressure is furnished by a motor driven pump 19 having its inlet connected with a reservoir 20 and its outlet connected with a conduit 21. I provide a spool-type control valve 22 having an inlet port connected with conduit 21, a second port connected with conduit 16 by means of conduit 23, a third port connected with conduit 17 by means of conduit 24, and a fourth port connected to a return conduit 25 which leads back to the reservoir 20. The core of valve 22 has three spaced lands as shown and is arranged to be moved to its right limiting position, as viewed in Figure 1, by a solenoid 26 and to its left limiting position upon energization of a solenoid 27. Valve 22 is self-centering so that upon de-energization of both solenoids 26 and 27 the ports connecting with conduits 23 and 24 are blocked thus locking the hydraulic fluid in the upper and lower ends of cylinder 15 thereby locking the piston in cylinder 15 against movement in either direction.

As shown in Figure 1, upon the solenoid 27 being energized and the core of valve 22 being consequently moved to the left, conduit 21 is connected with conduit 23 while conduit 17 is connected with return conduit 25 so that fluid flows into the upper end of cylinder 15 and out of the lower end thereof whereby the piston therein moves downwardly to close the electrodes 11 and 13.

Connecting with conduit 23 is a conduit 28 leading to the return conduit 25 and interposed in conduit 28 is an open valve 29 arranged to be closed by a solenoid 30, and an adjustable pressure relief valve 31. Thus, during normal operation of the welding machine and the closure of the electrodes onto the work after energization of solenoid 27 the welding force applied is determined by the setting of the relief valve 31, it being understood that after stoppage of downward movement of the piston in cylinder 15 the fluid delivered by the pump 19 is returned by way of conduit 28, relief valve 31 and conduit 25.

A second pressure relief valve 32, normally set for higher pressure than relief valve 31, is provided to discharge the output of pump 19 into return conduit 25 upon centering of valve 22 and the consequent blocking of conduit 21. When solenoid 27 is de-energized and solenoid 26 is energized the valve core is moved full to the right, connecting conduit 21 with conduit 24 and conduit 23 with conduit 25 whereby the piston 14 will be moved upwardly and the electrodes moved apart. A third relief valve 33 interconnects the conduit 24 with the return conduit 25 so that upon the piston 14 being moved to its uppermost position the output of pump 19 can be diverted to the reservoir 20 without unnecessarily high pressures being developed in the cylinder.

To adjustably limit the length of normal operating stroke of the slide 12 I provide a limit switch 35 having an operating arm 36 and adapted to control the hydraulic system in the manner to be hereinafter described and by means of the control circuit also to be hereinafter described. Switch 35 is mounted on a carrier 37 mounted for vertical sliding adjustment in a slot 38 formed in the bracket 10. A manually engageable screw-threaded clamping member 39 is provided to lock the switch in adjustment position and on the face of the bracket 10 I may provide a scale 40 to visually indicate the length of stroke alotted to the slide 12 during normal operation of the welding machine. The operating arm 36 of the switch 35 is arranged to be actuated by a member 41 (Figure 2) carried by the slide 12 and the arrangement is such that upon the slide 12 reaching a predetermined upper position as controlled by the location of the carrier 37 the switch 35 will be opened.

To control the apparatus thus far described there is provided a control circuit including the line conductors 42 and 43 leading from a suitable source of alternating current, conventional type relays 44, 45, 46, 47 and 48, a single stage foot switch 49, a two stage foot switch 50, and a ratchet type of relay 51 which is operative upon successive energizations to positively move the armature to alternate positions as will be understood. The nature of switch assembly 50 is such that upon manual actuation plunger A is first depressed followed automatically by plunger B. Upon release plunger B first retracts, followed by plunger A to restore the assembly to the position shown.

The operating coil for relay 48 is in a circuit which may be traced from line conductor 43 through conductor 52, normally closed first-stage contactor 53 of switch 50, conductor 54, normally open contactor 55 of switch 49, conductor 56, normally closed contactor 57 of relay 46, conductor 58, and coil of relay 48 to line conductor 42. Thus upon actuation of switch 49 relay 48 is energized and the solenoid 27 is energized through the circuit—line conductor 42, conductor 59, solenoid 27, conductor 60, contactor 61 of relay 48, and conductor 62 to line conductor 43. This moves core of valve 22 to the left as shown in Figure 1 and fluid pressure is admitted to the top of cylinder 15 to close the electrodes in the manner explained above. Coupled with conduit 16 is a pressure responsive switch 63 arranged to close a circuit comprised of conductors 64 and 65 upon proper welding force being applied between the electrodes. The primary winding of welding transformer 18 may be energized from the source comprising the conductors 42 and 43 under the control of apparatus shown schematically at 66 and such apparatus may be effective to connect the primary winding with the source for a predetermined interval of time following the closure of circuit 64—65 by switch 63. Welding current now begins to flow and to apply the increased or forging pressure above discussed solenoid 30 is now energized to abruptly block the circulation of the moving column of hydraulic fluid in the conduits 23 and 28 so that the inertia inherent in this moving column may be converted abruptly into increased pressure in the conduit 16. To effect such operation relay 44 is provided with a contactor 67 which connects the solenoid 30 across the line conductors 42, 43 upon energization of the coil of this relay. The energizing circuit for this coil may be traced from the line conductor 42 through said coil, conductors 68 and 64, switch 63, conductors 65 and 69, an adjustable time delay device 70 to delay energization of coil 44 for a predetermined interval following initiation of flow of welding current, conductor 71, a contactor 72 on relay 48, and conductor 62 to line conductor 43. Thus, simultaneously with the initiation of flow of welding current or at a delayed time with respect thereto, solenoid 30 is energized to abruptly close valve 29 thereby effecting an increased or forging pressure in the welding electrodes.

The energizing circuit for the coil of relay 46 includes the switch 35 so that upon opening of this switch the coil of relay 46 is de-energized. Relay 46 normally controls the energization of the solenoid 26 through the circuit which may be traced from line conductor 42, solenoid 26, conductor 73, contactor 74, of relay 45, conductor 75, contactor 76 of relay 46, conductor 77, contactor 78 of relay 48, and conductor 62 to line conductor 43. Thus, during upward movement of the slide 12 as results from energization of solenoid 26 the switch 35 is operated to de-energize relay 46 thereby de-energizing solenoid 26, allowing the valve 22 to center to lock the piston 14 in its position attained at the time of actuation of switch 35. It should be observed that this energizing circuit requires the relay 48 to be de-energized and to provide a sufficient weld "hold" time before the pressure is released from the electrodes and the electrodes opened (energization of solenoid 26) even though the foot switch 49 be held down. I insert a time delayed contactor 79 in the conductor 53 to open the circuit for the coil of relay 48 at a predetermined time during the welding cycle and the operation of this contactor 79 is also such that it provides for the automatic retraction of the upper electrode 13 through its normal operating stroke as will be understood.

To provide for the full retraction of the upper electrode or head of the welding machine the apparatus now to be described is utilized. Such apparatus includes the ratchet relay 51, the operating coil of which is in a circuit traceable from conductors 43 and 52 through contactor 80 of part A of switch 50, conductor 81, coil of relay 51, and conductor 82 to line conductor 42. Therefore upon the switch 50 being actuated through its first stage, contactor 83 of relay 51 is closed to condition a circuit traceable from line conductor 43 through the normally closed contactor 84 of foot switch 49, conductor 85, second-stage contactor 86 of switch 50, contactor 83, conductor 87, coil of relay 47, and conductor 88 to line conductor 42. Thus, upon the switch 50 being actuated through its second stage relay 47 is energized and by means of a contactor 89 on relay 47 the energizing circuit for solenoid 26 is bypassed around the contactor 76 of relay 57 and the solenoid 26 is again energized to continue the upward movement of the slide 12 beyond the point at which switch 35 is normally opened thereby providing for the full retraction of the slide. The switch 50 may now be released and because of the self-centering nature of the core in valve 22 the welding head including the upper electrode 13 will remain in uppermost position. To bring the head back down to the top of its normal operating stroke I provide an energizing circuit for the relay 45 which is traceable from line conductor 43 through contactor 84, conductor 85, contactor 86, contactor 90 of ratchet relay 15, conductor 91, contactor 92 of relay 46, coil of relay 45, and conductor 93 to line conductor 42. Switch 50 is now actuated and the coil of relay 51 is first energized to open contactor 83 while closing contactor 90 and shortly thereafter the coil of relay 45 is energized by closure of contactor 86. Such actuation of relay 45 opens the energizing circuit for solenoid 26 by reason of contactor 74 and simultaneously effects the energization of solenoid 27 through the circuit-line conductor 42, solenoid 27, conductor 60, conductor 94, contactor 95 of relay 45, contactor 76 of relay 46, conductor 77, conductor 78 of relay 48, and conductor 62 to line conductor 43. Downward movement of the slide continues automatically until proper position is reached to open switch 35 thereby de-energizing relay 46. The foot switch 50 may now be released and the system is in recycled condition for normal welding operation through actuation of the foot switch 49. A holding contact 96 is provided for relay 48 to insure complete performance of a welding cycle operation even though the foot switch 49 is released immediately.

It should now be appreciated that I have provided an improved driving assembly for the movable head of an electric resistance welding machine which accomplishes the objects initially set out. Through the use of the principles of the invention I am enabled to provide a driving or operating assembly for the movable welding head of an electric resistance welding machine which requires a minimum of mechanical apparatus but which, nevertheless provides for completeness and flexibility in the operation and control of the welding head, including the desirable features of a short but adjustable normal operating stroke, or a long full retraction stroke at the will of the operator, as well as an increased or forging pressure applicable in precisely timed relation during the welding cycle. Such mechanical apparatus as is required in the system is moreover of a simple and dependable nature, requiring only more or less conventional components, and as such the same may be economically produced and serviced as will be understood.

The above specifically described embodiment of the invention should be considered as illustrative only as obviously many changes may be made therein without departing from the spirit or scope of the invention. For example, while I have illustrated the invention as being applied to a spot welder, it should be clearly understood that the principles of the invention are equally applicable to resistance welders generally, including butt welders. Reference should therefore be had to the appended claims in determining the scope of the invention.

What I claim is:

1. In electric resistance welding apparatus having a movable head carrying a welding electrode and a hydraulic cylinder for moving said head the combination of a four-way valve for controlling the flow of hydraulic fluid into opposite ends of said cylinder, said valve being of the centering type and thus operative to simultaneously block the flow of fluid outwardly of either end of said cylinder whereby said head may be locked in predetermined position along its path of travel, and adjustable means operative upon said head reaching a predetermined position along its retraction stroke to actuate said valve to said centering position.

2. In electric resistance welding apparatus having a movable head carrying a welding electrode and having a hydraulic cylinder for moving said head the combination of a four-way valve for controlling the flow of fluid into and out of opposite ends of said cylinder whereby movement of said head may be controlled, a persistent source of hydraulic fluid pressure, a first conduit connecting said valve with an end of said cylinder for supplying fluid in a direction tending to apply welding force through said electrode, a second conduit connecting said valve with the opposite end of said cylinder, said valve being of the centering type whereby both of said conduits may be simultaneously blocked at said valve to lock the head in predetermined position, means to actuate said valve in opposite directions to effect opposite movements of said head, control means operative in response to said head reaching a predetermined retraction position to interrupt actuation of said valve whereby said valve returns to centering position, a return conduit connected with said first conduit and having therein a pressure relief valve and a controlled blocking valve, and means to actuate said blocking valve at a predetermined time during a welding cycle.

3. Apparatus according to claim 2 further including manually engageable control means to effect re-actuation of said valve after interruption by said first mentioned control means whereby said head may be further retracted along its full length of stroke afforded by said cylinder.

4. In electric resistance welding apparatus having a movable electrode carrying head and a hydraulic cylinder for moving said head in opposite directions and for applying welding force to said head the combination of conduit means to conduct hydraulic fluid into and out of opposite ends of said cylinder, adjustable means operative upon said head reaching a predetermined position along its retraction stroke to block said conduit means thereby locking hydraulic fluid in both ends of said cylinder to retain said head in a locked position, and manually controlled means to render inoperative said adjustable means whereby said head may be further retracted at the will of the operator.

5. In electric resistance welding apparatus having a movable slide carrying an electrode and a hydraulic cylinder for moving said slide the combination of a housing member movably supporting said slide, a limit switch, means adjustably mounting said limit switch on said housing member for adjustment along a line substantially parallel with movement of said slide, an operator for said limit switch carried by said slide, means to admit hydraulic fluid into one end of said cylinder while discharging fluid from the other end thereof whereby said slide may be moved in a retraction direction, and means operated by said limit switch to block said means to admit and discharge whereby retraction movement of said slide is automatically interrupted after which said slide is locked in the position attained.

6. Apparatus according to claim 5 further including manually controlled means to render said limit switch controlled means inoperative whereby said slide may be further retracted as desired.

MELVIN M. SEELOFF.

REFERENCES CITED

The following references are of record in the file of this patent:

UNITED STATES PATENTS

| Number | Name | Date |
| --- | --- | --- |
| 1,153,384 | Heany | Sept. 14, 1915 |
| 1,315,876 | Southall | Sept. 9, 1919 |
| 2,016,728 | Sciaky | Oct. 8, 1935 |
| 2,067,363 | Waeschle | Jan. 12, 1937 |
| 2,329,851 | Platz | Sept. 21, 1943 |

FOREIGN PATENTS

| Number | Country | Date |
| --- | --- | --- |
| 805,999 | France | Sept. 14, 1936 |
| 700,344 | Germany | Dec. 18, 1940 |